(12) United States Patent
Jiang

(10) Patent No.: US 12,434,143 B2
(45) Date of Patent: Oct. 7, 2025

(54) LIVESTREAMING PAGE DISPLAY METHOD AND APPARATUS, DEVICE, STORAGE MEDIUM, AND PROGRAM PRODUCT

(71) Applicant: Beijing Zitiao Network Technology Co., Ltd., Beijing (CN)

(72) Inventor: Ruyu Jiang, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/908,508

(22) Filed: Oct. 7, 2024

(65) Prior Publication Data

US 2025/0025783 A1    Jan. 23, 2025

Related U.S. Application Data

(63) Continuation of application No. PCT/CN2023/102746, filed on Jun. 27, 2023.

(30) Foreign Application Priority Data

Jun. 27, 2022    (CN) .......................... 202210743734.3

(51) Int. Cl.
*A63F 13/52* (2014.01)
*A63F 13/48* (2014.01)
(Continued)

(52) U.S. Cl.
CPC .............. *A63F 13/52* (2014.09); *A63F 13/48* (2014.09); *H04N 21/2187* (2013.01); *H04N 21/4316* (2013.01); *H04N 21/4781* (2013.01)

(58) Field of Classification Search
CPC ..... A63F 13/52; A63F 13/48; H04N 21/2187; H04N 21/4316; H04N 21/4781
See application file for complete search history.

(56) References Cited

U.S. PATENT DOCUMENTS

| 9,113,193 B1* | 8/2015 | Gardes ............... H04N 21/4113 |
| 2014/0253801 A1* | 9/2014 | Richman ............ H04N 21/4312 |
| | | 348/564 |

(Continued)

FOREIGN PATENT DOCUMENTS

| CN | 106303743 A | 1/2017 |
| CN | 109922353 A | 6/2019 |

(Continued)

OTHER PUBLICATIONS

International Search Report and Written Opinion received for PCT Patent Application No. PCT/CN2023/102746, mailed on Oct. 11, 2023, 18 pages (6 pages of English Translation and 12 pages of Original Document).

(Continued)

*Primary Examiner* — Yingchuan Zhang
(74) *Attorney, Agent, or Firm* — Astute IP Law Group

(57) ABSTRACT

A livestreaming page display method and apparatus, a device, a storage medium, and a program product are provided. The method includes: displaying a livestreaming page, wherein a first image is displayed in the livestreaming page, and the first image is a livestreaming image; receiving a display operation for a game; and in response to the display operation, displaying the first image in a first region of the livestreaming page, and displaying a second image of the game in a second region of the livestreaming page, wherein the second region is located outside the first region.

15 Claims, 7 Drawing Sheets

(51) Int. Cl.
*H04N 21/2187* (2011.01)
*H04N 21/431* (2011.01)
*H04N 21/478* (2011.01)

(56) References Cited

U.S. PATENT DOCUMENTS

2017/0001112 A1* 1/2017 Gilmore ............... A63F 13/49
2020/0009458 A1   1/2020 Onda et al.

FOREIGN PATENT DOCUMENTS

| | | |
|---|---|---|
| CN | 111669612 A | 9/2020 |
| CN | 112351302 A | 2/2021 |
| CN | 112468873 A | 3/2021 |
| CN | 112516589 A | 3/2021 |
| CN | 113127782 A | 7/2021 |
| CN | 113382277 A | 9/2021 |
| CN | 113457123 A | 10/2021 |
| CN | 113573090 A | 10/2021 |
| CN | 113630614 A | 11/2021 |
| CN | 113891103 A | 1/2022 |
| CN | 115174946 A | 10/2022 |
| CN | 115174946 B | 1/2024 |
| JP | 2019165490 A | 9/2019 |
| JP | 2022020640 A | 2/2022 |
| KR | 10-2019-0068339 A | 6/2019 |
| WO | 2022/105282 A1 | 5/2022 |

OTHER PUBLICATIONS

Notice of Allowance received for Chinese Patent Application No. 202210743734.3, mailed on Jan. 4, 2024, 8 pages (2 pages of English Translation and 6 pages of Original Document).
Office Action received for Chinese Patent Application No. 202210743734.3, mailed on Jul. 8, 2023, 13 pages (5 pages of English Translation and 7 pages of Original Document).
Ran Y., "Interactive Design of Netease FPS Mobile Game "Knives Out"", Excellent Master's Thesis, Technology of Hefei University, Jul. 15, 2021, 84 pages (English Abstract Submitted).
Examination Report No. 1 for Australian Patent Application No. 2023296433, mailed on Oct. 10, 2024, 5 pages.
Notice of Allowance for Korean Patent Application No. 10-2024-7033294, mailed on May 20, 2025, 5 pages.
Notice of Reasons for Refusal for Japanese Patent Application No. 2024-559380, mailed on Mar. 4, 2025, 6 pages.
Extended European Search Report and Search Opinion for European Patent Application No. 23830246.7, mailed on Jun. 6, 2025, 11 pages.
Richards, Paul W., "The Unofficial Guide to Open Broadcaster Software OBS: The World's Most Popular Live Streaming Software", Amazon.nl, Available on internet at <https://www.amazon.nl/-/en/Paul-William-Richards/dp/1098933842>, ISBN: 9781098933845, 2020, 138 pages.

* cited by examiner

LIVESTREAMING PAGE DISPLAY METHOD AND APPARATUS, DEVICE, STORAGE MEDIUM, AND PROGRAM PRODUCT

CROSS-REFERENCE TO RELATED APPLICATION

The present application is a continuation of International Patent Application No. PCT/CN2023/102746, filed on Jun. 27, 2023, which claims the priority of the Chinese patent application 202210743734.3 filed with the China National Intellectual Property Administration on Jun. 27, 2022, the entire contents of which are hereby incorporated by reference.

TECHNICAL FIELD

The present disclosure relates to the field of computer technology, in particular to a livestreaming page display method and apparatus, a device, a storage medium and a program product.

BACKGROUND

Currently, when users start a game, a game screen is generally displayed on top of a livestreaming screen and interactive information.

The display of the game screen may block the livestreaming screen in a livestreaming room, resulting in a poor user experience.

SUMMARY

Embodiments of the present disclosure provide a method, an apparatus, a device, a storage medium and a program product for displaying a livestreaming page.

In a first aspect, embodiments of the present disclosure provide a livestreaming page display method, the method includes:
  displaying a livestreaming page, wherein a first image is displayed in the livestreaming page, and the first image is a livestreaming image;
  receiving a display operation for a game; and
  in response to the display operation, displaying the first image in a first region of the livestreaming page, and displaying a second image of the game in a second region of the livestreaming page, wherein the second region is located outside the first region.

In a second aspect, embodiments of the present disclosure provide a livestreaming page display apparatus, the apparatus includes:
  a page display module configured to display a livestreaming page, wherein a first image is displayed in the livestreaming page, and the first image is a livestreaming image;
  an operation receiving module configured to receive a display operation for a game; and
  a screen display module configured to, in response to the display operation, display the first image in a first region of the livestreaming page, and display a second image of the game in a second region of the livestreaming page, wherein the second region is located outside the first region.

In a third aspect, embodiments of the present disclosure provide an electronic device, the electronic device includes:
  at least one processor;
  a memory configured to store at least one program, when the at least one program is executed by the at least one processor, the at least one processor is enabled to realize the livestreaming page display method according to the embodiment of the present disclosure.

In a fourth aspect, the embodiment of the present disclosure also provides a computer-readable storage medium, on which a computer program is stored, when the computer program is executed by a processor, the livestreaming page display method is realized according to the embodiment of the present disclosure.

In a fifth aspect, the embodiment of the present disclosure also provides a computer program product, which, when executed by a computer, causes the computer to realize the livestreaming page display method according to the embodiment of the present disclosure.

BRIEF DESCRIPTION OF DRAWINGS

Throughout the drawings, the same or similar reference numerals indicate the same or similar elements. It should be understood that the drawings are schematic, and elements are not necessarily drawn to scale.

DETAILED DESCRIPTION

Embodiments of the present disclosure will be described in more detail below with reference to the drawings.

It should be understood that various steps recorded in the implementation modes of the method of the present disclosure may be performed according to different orders and/or performed in parallel. In addition, the implementation modes of the method may include additional steps and/or omit the illustrated steps. The scope of the present disclosure is not limited in this aspect.

The term "including" and variations thereof used in this article are open-ended inclusion, namely "including but not limited to". The term "based on" refers to "at least partially based on". The term "one embodiment" means "at least one embodiment"; the term "another embodiment" means "at least one other embodiment"; and the term "some embodiments" means "at least some embodiments". Relevant definitions of other terms may be given in the description hereinafter.

The concepts such as "first", "second", etc., mentioned in the present disclosure are only used to distinguish different devices, modules or units, and are not used to limit the order of functions performed by these devices, modules or units or interdependence relationship.

The modifications of "a" and "a plurality" mentioned in the present disclosure are illustrative rather than restrictive, and those skilled in the art should understand that unless the context clearly indicates otherwise, they should be understood as "at least one".

The names of messages or information exchanged between multiple devices in the embodiments of the present disclosure are only for illustrative purposes, and are not intended to limit the scope of these messages or information.

Figure 1:
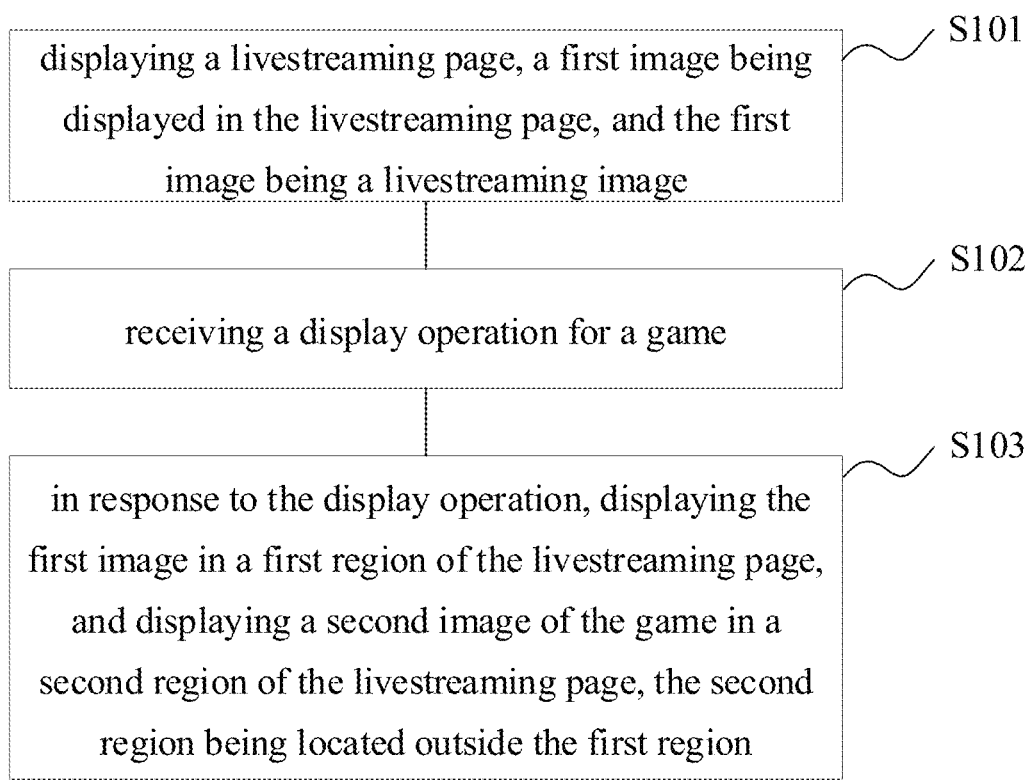
FIG. 1 is a schematic flowchart of a livestreaming page display method according to embodiments of the present disclosure.

FIG. 1 is a schematic flowchart of a livestreaming page display method according to embodiments of the present disclosure. The method may be performed by a livestreaming page display apparatus. The apparatus may be realized by software and/or hardware, and may be configured in an electronic device, typically in a smartphone or a tablet. The livestreaming page display method provided by the embodiments of the present disclosure is applicable for scenarios where users play games while performing livestreaming or watching a live stream. As shown in FIG. 1, the livestreaming page display method provided by the embodiments may include the following steps.

In S101, displaying a livestreaming page, a first image being displayed in the livestreaming page, and the first image being a livestreaming image.

The first image is the livestreaming image displayed in the livestreaming page, such as an image captured by a camera, or an image of media content viewed by an anchor. The first image may be a livestreaming screen image by an anchor side or a livestreaming image that needs to be sent to a client. For example, when a user is live streaming, the first image may be an image captured by a camera on a user side. When a user is watching the livestreaming, the first image may be a live screen of an anchor side, that is, a live screen sent by the anchor side. The following example illustrates a scenario where a user is live streaming.

For example, the livestreaming image is a real-time image of an anchor, $101 may include: before receiving the display operation, displaying the first image in full screen.

Figure 2:
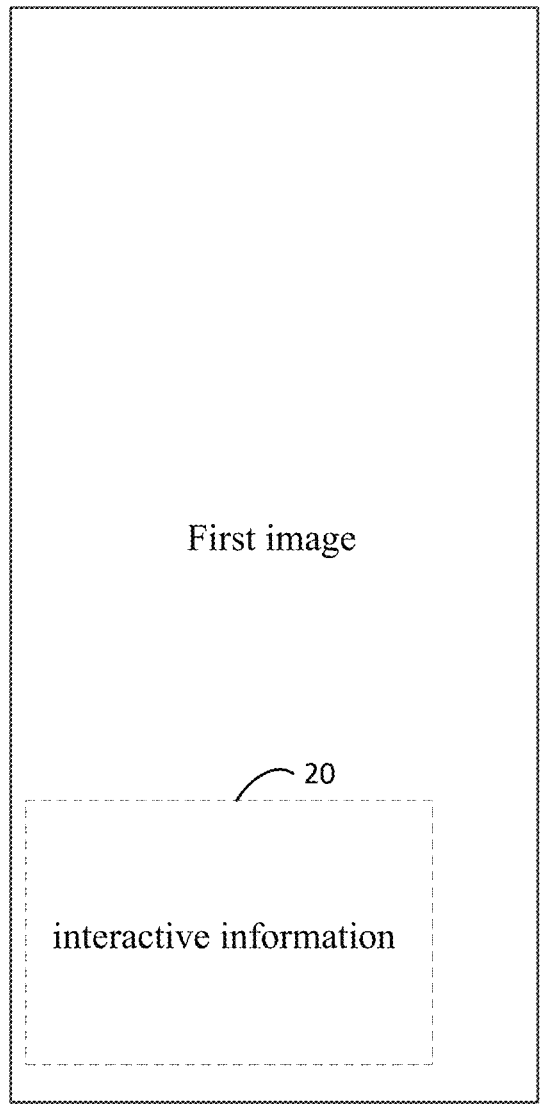
FIG. 2 is a schematic diagram of the display of a livestreaming page according to embodiments of the present disclosure.

For example, when a user is live streaming or watching a live stream, a livestreaming page may be displayed, and a first image of an anchor side may be displayed in the livestreaming page. For example, the first image of the anchor side is displayed in a main display region of the livestreaming page, as shown in FIG. 2. In S102, receiving a display operation for a game.

For example, the game in the embodiments of the present disclosure may be a game for which the display operation is directed, and the game may be an interactive game configured in application software corresponding to the livestreaming page or a game that exists independently of the application software corresponding to the livestreaming page, or alternatively, an interactive game configured in the application software corresponding to the livestreaming page. When a user is live streaming, the game may be a game currently played by the user. When a user watches the live stream, the game may be a game played by the user or a game played by the anchor in the livestreaming channel. The display operation may be an operation for indicating the display for a game image of the game in the livestreaming page and/or an operation for indicating the display of interactive information, such as an operation for triggering a screen projection control displayed in the livestreaming page.

For example, when the user intends to instruct an electronic device to display the game image of the game outside a display region of the first image, the display operation for the game may be executed, such as instructing the electronic device to display a control panel related to the game in the livestreaming page by executing a corresponding trigger operation (for example, triggering more controls displayed in the livestreaming page or the game panel of the target game), and triggering a screen projection control in the control panel. Accordingly, the electronic device may receive the display operation of the user for the game, for example, it may be determined that the display operation for the target game is received when it is detected that the user triggers the screen projection control.

Figure 3:
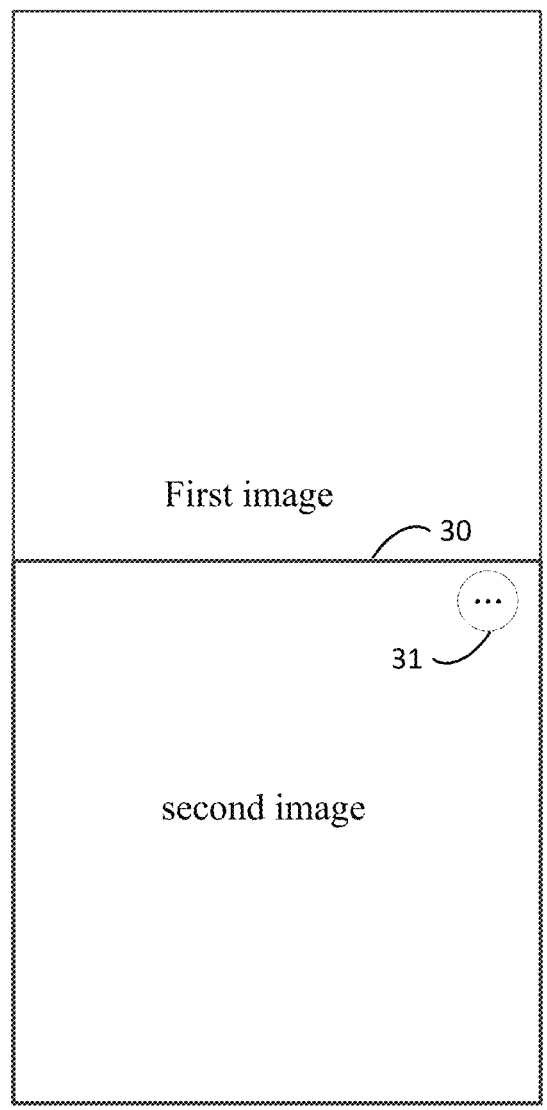
FIG. 3 is a schematic diagram of the display of a game panel according to embodiments of the present disclosure.

It can be understood that before receiving the display operation for the game, the livestreaming page may also display the interactive information in the livestreaming channel and/or the game image of the game, such as displaying the first image of the anchor side in the main display region of the livestreaming page, and displaying the interactive information 20 and/or the game panel 30 of the game on top of the first image, such as displaying the game panel 30 of the game on top of the first image or the interactive information 20; and the game image of the game (i.e., a second image) and more controls 31 are displayed in the game panel 30, that is, part of the first image is blocked by the game image of the game, and/or part or all of the interactive information is blocked by the game screen of the game, as shown in FIG. 2 and FIG. 3 (with FIG. 3 illustrating a scenario where all the interactive information is blocked by the game image of the game).

In S103, in response to the display operation, displaying the first image in a first region of the livestreaming page, and displaying a second image of the game in a second region of the livestreaming page, the second region being located outside the first region.

The second image may be understood as the game image of the game, which may be the game image of the game played by the anchor or the current user. For example, in a scenario where the user is live streaming, the second image may be the game image of the game played by the user; and in a scenario where the user is watching a live stream, the second image may be the game image of the game played by the anchor or the game image of the game played by the user. This embodiment does not impose any restrictions on this.

Figure 4:
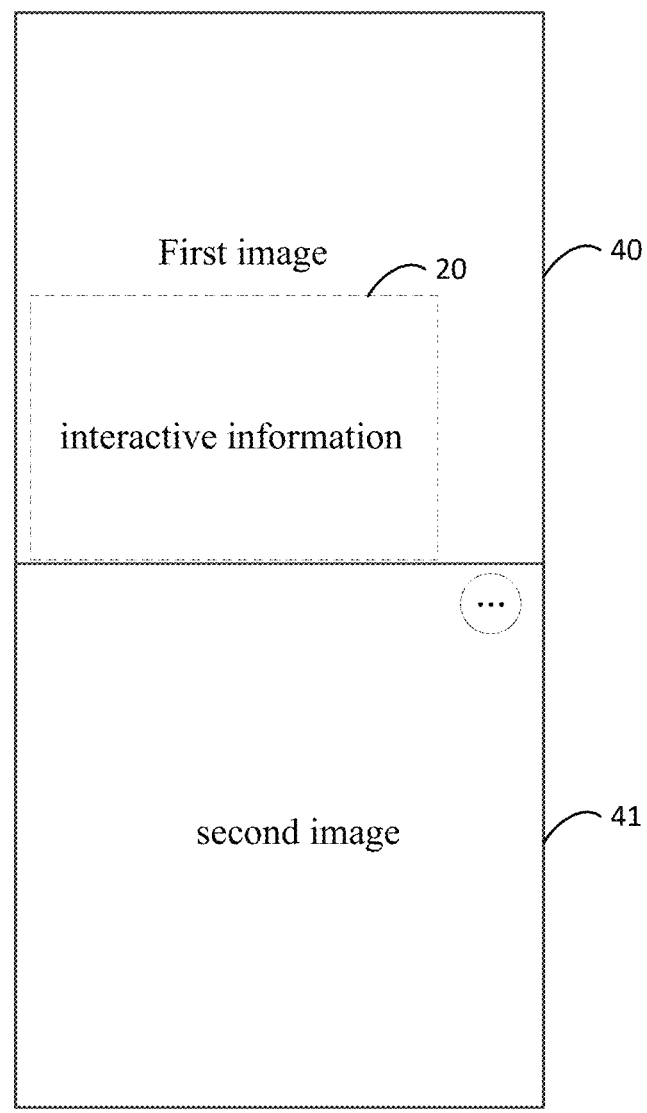
FIG. 4 is another schematic diagram of the display of a livestreaming page according to embodiments of the present disclosure.

For example, in response to receiving a display operation, displaying the first image in the first region 40 of the livestreaming page, and displaying the second image of the game in the second region 41 outside the first region 40 in the livestreaming page, as shown in FIG. 4. Therefore, the anchor side may conveniently and quickly control the display of the game image through the above interactive operation, so that the client can efficiently obtain screen information of the anchor and screen information of the game.

For example, when the user is live streaming or watching a live stream, the livestreaming page may be displayed, and the first image is displayed in the livestreaming page in a full screen manner. After receiving the display operation for the game, the first image is scaled so as to be displayed in the first region of the livestreaming page, and the second image of the game is displayed in the second region of the livestreaming page. Here, the second region is located outside the first region.

For example, when displaying the first image in the first region of the livestreaming page and displaying the second image in the second region of the livestreaming page, the first image and the second image may be located in the same or different layers of the livestreaming page, or alternatively, the first image and the second image may be located in the same layer of the livestreaming page, so as to reduce the number of layers that need to be set in the livestreaming page.

In a case where the first image and the second image are located in the same layer of the livestreaming page, if the second image of the game is not displayed in the livestreaming page before receiving the display operation, then in response to the display operation, adding and displaying the second image in a layer where the first image is located; and if the second image of the game is displayed in the livestreaming page before receiving the display operation, a layer where the second image is located may be adjusted so that the second image is displayed in the layer where the first image is located. In this case, alternatively, displaying the second image of the game in the second region of the livestreaming page may include: adjusting the second image of the game to a layer where the first image is located for display.

In an embodiment, before receiving the display operation for the game, the interactive information in the livestreaming channel may not be displayed in the livestreaming page. Therefore, when receiving the display operation for the game, the interactive information in the livestreaming channel may also be displayed in the livestreaming page, such as displaying the interactive information on top of the first image displayed in the first region for the user to view. In this case, the livestreaming page display method provided by the embodiments may further include: displaying interactive information on the first image in response to the display operation. Here, the interactive information may be understood as interactive information in the livestreaming channel corresponding to the livestreaming page, such as comment information and virtual item information sent by the anchor and/or viewer in the livestreaming channel.

In another embodiment, before receiving the display operation for the game, the interactive information in the livestreaming channel may be displayed in the livestreaming page. Therefore, when receiving the display operation for the game, adjusting a display position of the interactive information to display the interactive information outside the second region. In this case, the interactive information may also be displayed in the livestreaming page. Displaying the first image in a first region of the livestreaming page, and displaying a second image of the game in a second region of the livestreaming page may include: displaying the first image in the first region of the livestreaming page, displaying the second image of the game in the second region of the livestreaming page, and displaying the interactive information outside the second region.

When the interactive information is adjusted to be displayed outside the second region where the second image is located, the interactive information may be displayed in the layer where the first image is located; alternatively, the interactive information is displayed on top of the first image, that is, a layer where the interactive information is located is above the layer where the first image is located, so as to prevent the first image from appearing too small and meet users' needs to view the first livestreaming image, the second livestreaming image, and the interactive information. Alternatively, as shown in FIG. 4, the interactive information may be displayed in the display region where the first image is located. For example, the first image and the interactive information 20 are displayed in the first region 40 of the livestreaming page, such as displaying the interactive information 20 on top of the first image displayed in the first region 40; and the second image of the game is displayed in the second region 41 of the livestreaming page.

In the embodiments, the first image is displayed in the first region of the livestreaming page, the second image of the game is displayed in the second region of the livestreaming page, and the interactive information in the livestreaming channel is displayed outside the display region of the second image, so that simultaneous display of the first image, the second image and the interactive information is realized, and users' needs to view the first image, the second image, and the interactive information are met; further, the simplicity of displaying the second image is enhanced, avoiding interference from the display of the interactive information with users' viewing of the second image or their control over the game. In addition, simultaneous display of the first image (such as the anchor screen) and the second image (the game screen) in the livestreaming page is realized without the need for professional video editing experience or complex video editing interactions, simplifying the interaction mode and enhancing users' interactive experience.

In an implementation mode, in response to the display operation, displaying the first image in a first region of the livestreaming page, and displaying a second image of the game in a second region of the livestreaming page, may include: in response to the display operation, displaying a plurality of candidate page layouts; receiving a selection operation for any of the plurality of candidate page layouts, and determining a candidate page layout corresponding to the selection operation as a target page layout; and displaying the first image in the first region of the livestreaming page and the second image of the game in the second region of the livestreaming page according to the target page layout.

The candidate page layout may be understood as a page layout that the user can choose when the first image and the second image are displayed. In different page layouts, the first image and the second image may have different display modes, and the display modes may include, for example, the size and/or position of the first region for displaying the first image and the second region for displaying the second image in the livestreaming page. The target page layout may be understood as the candidate page layout selected by the user. The selection operation may be understood as an operation of selecting a candidate page layout as the target page layout, such as an operation of triggering a candidate page layout, or an operation of clicking a confirm control after triggering a candidate page layout.

For example, when the display operation for the game is received, a plurality of candidate page layouts may be displayed in the livestreaming page in response to the display operation, allowing the user to select a candidate page layout as the target page layout through the selection operation. Accordingly, upon detecting the selection operation of the user, the electronic device can take a candidate page layout corresponding to the selection operation (such as a candidate page layout triggered by the selection operation or a candidate page layout in a selected state) as the target page layout, and display the first image in the first region of the livestreaming page and the second image of the game in the second region of the livestreaming page according to the target page layout.

In the above implementation mode, a plurality of candidate page layouts are set in advance, so that the user can select a page layout that meets their needs to watch the first image and the second image in the livestreaming page. This approach offers a richer variety of page layout options to cater to different user needs and enhance user experience.

In another implementation mode, in response to the display operation, displaying the first image in a first region of the livestreaming page, and displaying a second image of the game in a second region of the livestreaming page, may include: determining a target page layout according to a livestreaming video type, the livestreaming video type including a landscape screen or a portrait screen; displaying the first image in the first region of the livestreaming page and displaying the second image of the game in the second region of the livestreaming page according to the target page layout.

In the above implementation mode, the first image and the second image may also be displayed in the livestreaming page using a page layout corresponding to the livestreaming video type. For example, when the livestreaming video type is a landscape screen, the first region and the second region may be horizontally arranged; and when the livestreaming video type is a portrait screen, the first region and the second region may be vertically arranged, so as to optimize the page layout of the livestreaming page when the first image and the second image are displayed. Here, the livestreaming video type may be understood as a type of a livestreaming video, such as a type of the first image and/or the second image.

The livestreaming page display method provided by the embodiments includes: displaying a livestreaming page, a first image being displayed in the livestreaming page, and the first image being a livestreaming image; receiving a display operation for a game; and in response to the display operation, displaying the first image in a first region of the livestreaming page, and displaying a second image of the game in a second region of the livestreaming page, the second region being located outside the first region. According to the above technical scheme, the game image is displayed outside the display region where the live image is located, which can prevent the display of the game image from blocking the live screen and improve the user experience.

Figure 5:
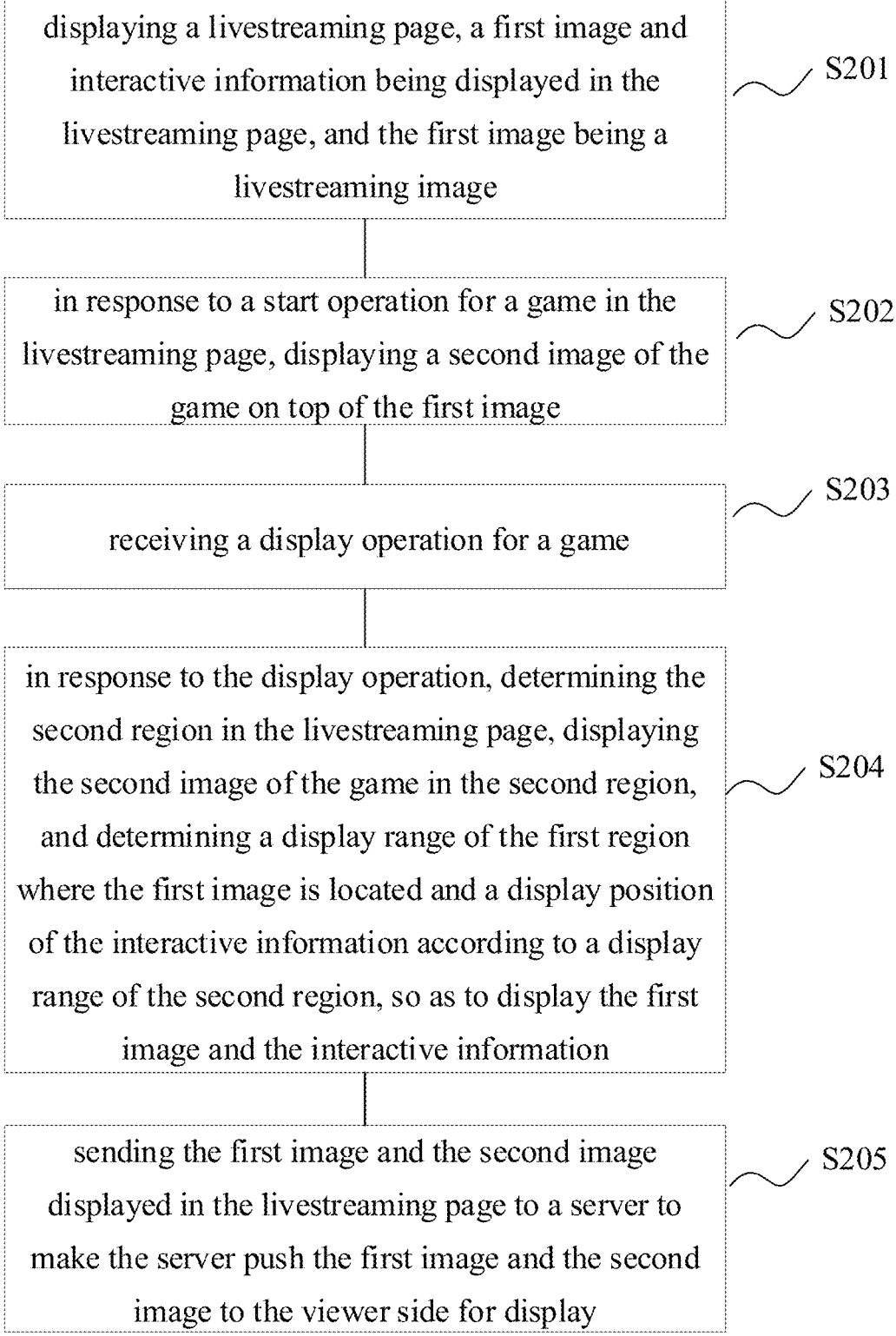
FIG. 5 is another schematic flowchart of the livestreaming page display method according to embodiments of the present disclosure.

FIG. 5 is another schematic flowchart of the livestreaming page display method according to embodiments of the present disclosure. The scheme in this embodiment may be combined with at least one alternative scheme in the above embodiment. Alternatively, displaying the first image in the first region of the livestreaming page, displaying the second image of the game in the second region of the livestreaming page, and displaying the interactive information outside the second region, may include: determining the second region in the livestreaming page, displaying the second image of the game in the second region, and determining a display range of the first region where the first image is located and a display position of the interactive information according to a display range of the second region, so as to display the first image and the interactive information.

Alternatively, before receiving the display operation for the game, the method further includes: in response to a start operation for the game in the livestreaming page, displaying the second image of the game on top of the first image.

Alternatively, after displaying the first image in the first region of the livestreaming page and displaying the second image of the game in the second region of the livestreaming page, the method further includes: sending the first image and the second image displayed in the livestreaming page to a server, to make the server push the first image and the second image to a client for display.

As shown in FIG. 5, the livestreaming page display method provided by this embodiment may include the following steps.

In S201, displaying a livestreaming page, a first image and interactive information being displayed in the livestreaming page, and the first image being a livestreaming image.

Taking the anchor side as an example, i.e., taking the scenario where the user performing livestreaming as an example, when the user starts to perform livestreaming (before launching any game), the livestreaming page may display the first image and the interactive information 20. For example, the livestreaming page may be displayed, the first image captured by a camera may be displayed in a main display region of the livestreaming page, and the interactive information 20 in the livestreaming channel may be displayed on top of the first image. For example, the interactive information 20 in the livestreaming channel may be displayed in a predetermined region within a display region where a subsequent game panel is located, as illustrated in FIG. 2. The first image may be pushed to the client for display through a server.

In S202, in response to a start operation for a game in the livestreaming page, displaying a second image of the game on top of the first image.

The start operation may be understood as an operation of starting a game, such as an operation of triggering a display region of a game identifier in the livestreaming page. The game identifier may include, for example, at least one of a game icon, a game name and game introduction information.

Taking the anchor side as an example, the livestreaming page may display a game control. When the user intends to play a game, the game control may be triggered. Upon detecting that the user triggers the game control, the electronic device may display a game selection panel in the livestreaming page, and display the game identifier of each game that may be selected by the user in the game selection panel. And therefore, when the user wants to play a certain game, the game identifier of the game may be triggered. Accordingly, upon detecting that the user triggers a certain game identifier, the electronic device may display a second image of the game on top of the first image and the interactive information displayed in the livestreaming page, such as displaying a game panel 30 of the game on top of the first image and the interactive information, and displaying the second image of the game in the game panel 30, as shown in FIG. 3. Only the first image is sent to the server as the live screen, so that the server can push the first image to the client for display, that is, the second image of the game may not be actively pushed to the viewer for display. Therefore, audiences in the livestreaming channel can watch the first image of the anchor in the livestreaming page of the client.

In addition, to view the game image of the anchor (i.e., the second image), the viewer may perform a trigger operation for instructing the client to display the game image of the anchor. Accordingly, upon detecting the trigger operation of the viewer, the client may obtain the game image of the anchor through the server and display the game image on top of the displayed first image of the anchor and the interactive information in the livestreaming channel.

It can be understood that after displaying the second image of the game, the interactive information in the livestreaming channel may be partially or completely blocked by the second image, so after receiving the start operation for the game in the livestreaming page, the display of the interactive information in the livestreaming channel may be canceled, so as to simplify the content to be displayed in the livestreaming page on the premise of meeting the display requirements of the first image and the second image.

In S203, receiving a display operation for a game.

In S204, in response to the display operation, determining the second region in the livestreaming page, displaying the second image of the game in the second region, and determining a display range of the first region where the first image is located and a display position of the interactive information according to a display range of the second region, so as to display the first image and the interactive information.

For example, when receiving the display operation for the game, the second region 41 for displaying the second image may be determined in the livestreaming page according to a preset display size and a preset display position of the second region 41, the second image of the game may be displayed in the second region 41, the display range of the first region 40 where the first image is located may be determined according to the display range of the second region 41, and the first image and the interactive information 20 may be displayed in the first region 40.

In the embodiments, a display size of the first image may also be adjusted according to the display range of the first region. For example, the first image may be scaled and/or cropped according to the display range of the first region 40, and the scaled and/or cropped first image is displayed in the first region 40, as shown in FIG. 4. In this case, alternatively, the step of displaying the first image in the first region of the livestreaming page includes: cropping the first image according to the display range of the first region and displaying the cropped first image in the first region.

In S205, sending the first image and the second image displayed in the livestreaming page to a server to make the server push the first image and the second image to the client for display.

For example, after displaying the second image in the second region, sending the first image and the second image displayed in the livestreaming page to the server to make the server push the first image and the second image to the client.

Figure 6:
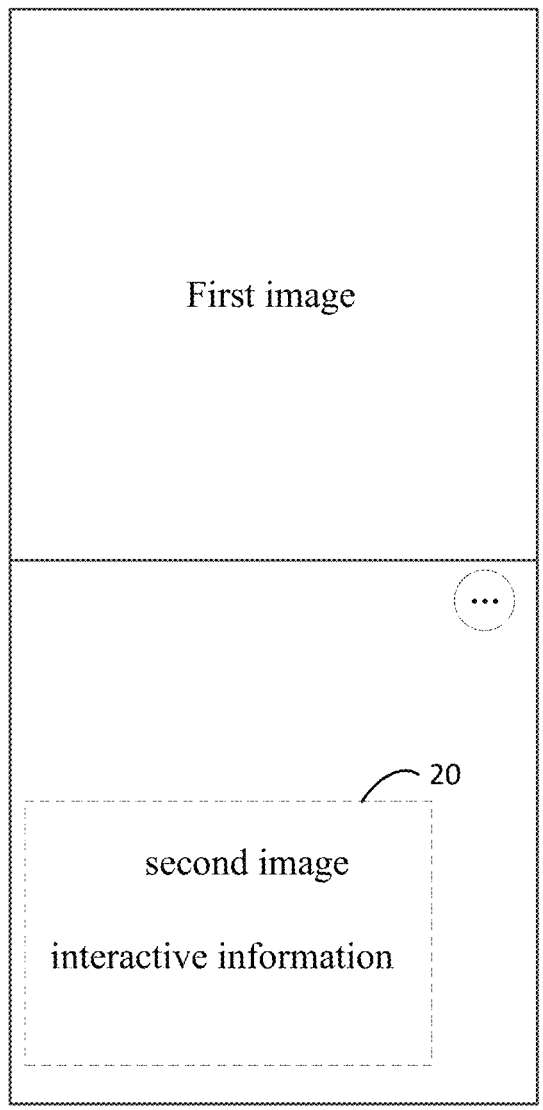
FIG. 6 is yet another schematic diagram of the display of a livestreaming page according to embodiments of the present disclosure.

Therefore, the client may display the first image and the second image pushed by the server, and display the interactive information 20 in the livestreaming channel on top of the first image and the second image, as shown in FIG. 6.

In addition, the viewer at the client may also play the game with the anchor or play a game by themselves (such as the game or other games than the game) by executing the corresponding trigger operation. In this case, a game image of the game played by the viewer may be displayed on top of the first image, the second image and the interactive information, at the client.

In the embodiments, when the anchor starts to play a game, only the first image of the anchor is sent to the client for display, and after receiving a trigger operation of the viewer for instructing that the game image of the anchor be displayed and/or a display operation of the anchor for the game, sending the game image of the anchor to the client, so that users can choose whether to broadcast the game livestreaming or whether to watch the game image of the anchor as needed, enriching the users' livestreaming modes and livestream viewing modes, thereby enhancing the user experience.

In the embodiments, when sending the first image and the second image displayed in the livestreaming page to the server, the first livestreaming image may be sent to the server as an independent video stream and the second livestreaming image may be sent to the server as another independent video stream, and the two video streams may be combined into one live stream by the server. Alternatively, the first image and the second image displayed in the livestreaming page may be directly sent to the server as one video stream, that is, screens displayed in the livestreaming page are sent to the server as a live stream, thus reducing the network resources and computing resources occupied in the livestreaming process, consequently decreasing latency in the live screen on the client and mitigating instances of buffering during the livestreaming.

It can be understood that after executing the display operation for the game, the user may also instruct the electronic device to re-display the first image and the interactive information in the main display region of the livestreaming page by executing a display cancel operation, and display the second image on top of the first image and the interactive information; and/or, performing a close operation for the game to instruct the electronic device to close the game, display the first image and the interactive information in the main display region of the livestreaming page, and cancel the display of the second image of the game.

According to the livestreaming page display method provided by the embodiments, when the anchor starts the game, the second image is displayed on the first image; and when the display operation of the anchor for the game is received, the first image and the second image are displayed in different regions of the livestreaming page, the display position of the interactive information is adjusted to be outside of the second region, and the first image and the second image are sent to the client for display, so that the anchor may select different game image display modes as needed and the viewer can directly watch the game image of the anchor, which enriches the users' livestreaming modes and simplifies the operations needed for viewers to watch the game image of the anchor.

Figure 7:
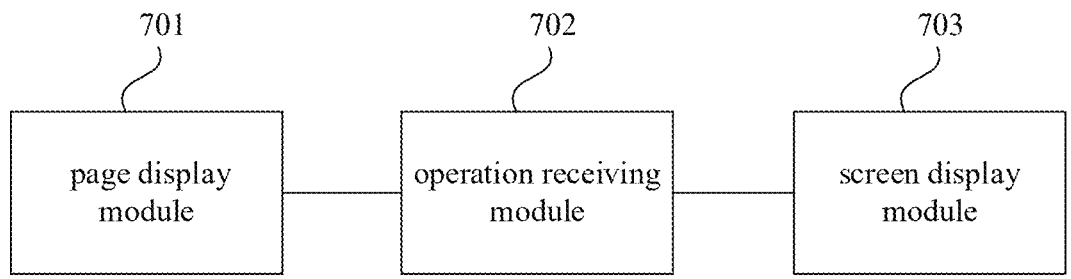
FIG. 7 is a structural block diagram of a livestreaming page display apparatus according to embodiments of the present disclosure.

FIG. 7 is a structural block diagram of a livestreaming page display apparatus according to embodiments of the present disclosure. The apparatus may be realized by software and/or hardware, and may be configured in electronic devices, typically in smartphones or tablets. The display of a game screen and interactive information may be realized by executing a livestreaming page display method. As shown in FIG. 7, the livestreaming page display apparatus provided by the embodiments may include a page display module 701, an operation receiving module 702 and a screen display module 703.

The page display module 701 is configured to display a livestreaming page. The first image is displayed in the livestreaming page, and the first image is a live screen.

The operation receiving module 702 is configured to receive a display operation for a game.

The screen display module 703 is configured to, in response to the display operation, display the first image in a first region of the livestreaming page, and display a second image of the game in a second region of the livestreaming page. Herein, the second region is located outside the first region.

According to the livestreaming page display apparatus provided by the embodiments, the livestreaming page is displayed through the page display module, where the first image is displayed in the livestreaming page, and the first image is the livestreaming image; the display operation for the game is received through the operation receiving module; and in response to the display operation, the first image is displayed in the first region of the livestreaming page and the second image of the game is displayed in the second region of the livestreaming page through the screen display module, where the second region is located outside the first region. According to the above technical scheme, the game image is displayed outside the display region where the livestreaming image is located, which can prevent the display of the game image from blocking the livestreaming image and improve the user experience.

In the above scheme, the screen display module 703 may be further configured to display interactive information on the first image in response to the display operation.

In the above scheme, the livestreaming page may also display interactive information, and the screen display module 703 may be configured to display the first image in the first region of the livestreaming page, display the second image of the game in the second region of the livestreaming page, and display the interactive information outside the second region.

In the above scheme, the screen display module 703 may be configured to determine the second region in the livestreaming page, display the second image of the game in the second region, and determine a display range of the first region where the first image is located and a display position of the interactive information according to a display range of the second region, so as to display the first image and the interactive information.

In the above scheme, the screen display module 703 may include a layout display unit configured to display a plurality of candidate page layouts in response to the display operation; a first layout determining unit configured to receive a selection operation for any of the plurality of candidate page layouts and determine a candidate page layout corresponding to the selection operation as a target page layout; and a first image display unit configured to display the first image in the first region of the livestreaming page and the second image of the game in the second region of the livestreaming page according to the target page layout.

In the above scheme, the screen display module 703 may include a second layout determining unit configured to determine a target page layout according to a livestreaming video type, the livestreaming video type includes a landscape image or a portrait image; and a second image display unit configured to display the first image in the first region of the livestreaming page and display the second image of the game in the second region of the livestreaming page according to the target page layout.

Alternatively, the livestreaming page display apparatus provided by the embodiments may further include a game start module configured to, before receiving the display operation for the game, in response to a start operation for the game in the livestreaming page, display the second image of the game on top of the first image.

In the above scheme, the screen display module 703 may be configured to adjust the second image of the game to a layer where the first image is located for display.

Alternatively, the livestreaming page display apparatus provided by the embodiments may further include a image sending module configured to, after displaying the first image in the first region of the livestreaming page, and displaying the second image of the game in the second region of the livestreaming page, send the first image and the second image displayed in the livestreaming page to a server, so that the server pushes the first image and the second image to a client for display.

In the above scheme, the screen display module 703 may be configured to crop the first image according to the display range of the first region, and display the cropped first image in the first region.

The livestreaming page display apparatus provided by the embodiments may perform the livestreaming page display method provided by any embodiment of the present disclosure, and has corresponding functional modules for executing the livestreaming page display method. For technical details not described in the embodiments, please refer to the livestreaming page display method provided by any embodiment of the present disclosure.

Figure 8:
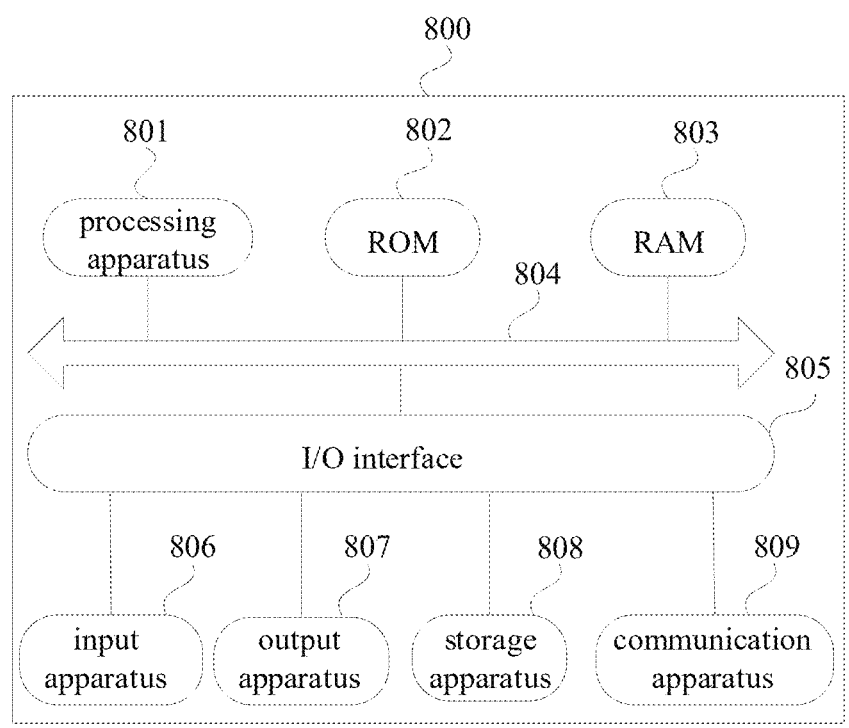
FIG. 8 is a structural diagram of an electronic device according to embodiments of the present disclosure.

Referring to FIG. 8, FIG. 8 is a structural diagram of an electronic device (for example, a terminal device) 800 suitable for implementing the embodiments of the present disclosure. The terminal device in the embodiments of the present disclosure may include but not limited to mobile terminals such as mobile phones, notebook computers, digital broadcast receivers, personal digital assistants (PDA), portable android devices (PAD), portable multimedia players (PMP), and vehicle-mounted terminals (such as vehicle-mounted navigation terminals), and fixed terminals such as digital television (TV) and desktop computers. The electronic device shown in FIG. 8 is only an example, and should not impose any limitations on the functionality and scope of use of the embodiments of the present disclosure.

As shown in FIG. 8, the electronic device 800 may include a processing apparatus (such as a central processing unit and a graphics processor) 801, which may execute various appropriate actions and processes according to a program stored in a read-only memory (ROM) 802 or a program loaded from a storage apparatus 808 to a random-access memory (RAM) 803. In RAM 803, various programs and data required for operations of the electronic device 800 are also stored. The processing apparatus 801, ROM 802 and RAM 703 are connected to each other by a bus 804. An input/output (I/O) interface 805 is also connected to the bus 804.

Generally, the following apparatuses MAY be connected to the I/O interface 805: an input apparatus 806 such as a touch screen, a touch pad, a keyboard, a mouse, a camera, a microphone, an accelerometer, and a gyroscope; an output apparatuses 807 such as a liquid crystal display (LCD), a speaker, and a vibrator; a storage apparatus 808 such as a magnetic tape, and a hard disk drive; and a communication apparatus 809. The communication apparatus 809 may allow the electronic device 800 to wireless-communicate or wire-communicate with other devices so as to exchange data. Although FIG. 8 shows the electronic device 800 with various apparatuses, it should be understood that it is not required to implement or possess all the apparatuses shown. Alternatively, it may implement or possess the more or less apparatuses.

In particular, according to the embodiment of the present disclosure, the process described above with reference to the flow diagram may be achieved as a computer software program. For example, an embodiment of the present disclosure includes a computer program product, it includes a computer program loaded on a non-transient computer-readable medium, and the computer program contains a program code for executing the method shown in the flow diagram. In such an embodiment, the computer program may be downloaded and installed from the network by the communication apparatus 809, or installed from the storage apparatus 808, or installed from ROM 802. When the computer program is executed by the processing apparatus

801, the above functions defined in the method in the embodiments of the present disclosure are executed.

It should be noted that the above computer-readable medium in the present disclosure may be a computer-readable signal medium, a computer-readable storage medium, or any combinations of the two. The computer-readable storage medium may be, for example, but not limited to, a system, an apparatus or a device of electricity, magnetism, light, electromagnetism, infrared, or semiconductor, or any combinations of the above. More specific examples of the computer-readable storage medium may include but not be limited to: an electric connector with one or more wires, a portable computer magnetic disk, a hard disk drive, a random access memory (RAM), a read-only memory (ROM), an erasable programmable read-only memory (EPROM or flash memory), an optical fiber, a portable compact disk read-only memory (CD-ROM), an optical storage device, a magnetic storage device or any suitable combinations of the above. In the present disclosure, the computer-readable storage medium may be any visible medium that contains or stores a program, and the program may be used by an instruction executive system, apparatus or device or used in combination with it. In the present disclosure, the computer-readable signal medium may include a data signal propagated in a baseband or as a part of a carrier wave, it carries the computer-readable program code. The data signal propagated in this way may adopt various forms, including but not limited to an electromagnetic signal, an optical signal, or any suitable combinations of the above. The computer-readable signal medium may also be any computer-readable medium other than the computer-readable storage medium, and the computer-readable signal medium may send, propagate, or transmit the program used by the instruction executive system, apparatus or device or in combination with it. The program code contained on the computer-readable medium may be transmitted by using any suitable medium, including but not limited to: a wire, an optical cable, a radio frequency (RF) or the like, or any suitable combinations of the above.

In some implementation modes, a client and a server may be communicated by using any currently known or future-developed network protocols such as a Hypertext Transfer Protocol (HTTP), and may interconnect with any form or medium of digital data communication (such as a communication network). Examples of the communication network include a local region network ("LAN"), a wide region network ("WAN"), an internet work (such as the Internet), and an end-to-end network (such as an ad hoc end-to-end network), as well as any currently known or future-developed networks.

The above-described computer-readable medium may be included in the above-described electronic device, or may also exist alone without being assembled into the electronic device.

The above-described computer-readable medium carries one or more programs, and when the one or more programs are executed by the electronic device, the electronic device is caused to: display a livestreaming page, a first image being displayed in the livestreaming page, and the first image being a livestreaming image; receive a display operation for a game; and in response to the display operation, display the first image in a first region of the livestreaming page, and display a second image of the game in a second region of the livestreaming page, the second region being located outside the first region.

The computer program code for executing the operation of the present disclosure may be written in one or more programming languages or combinations thereof, the above programming language includes but is not limited to object-oriented programming languages such as Java, Smalltalk, and C++, and also includes conventional procedural programming languages such as a "C" language or a similar programming language. The program code may be completely executed on the user's computer, partially executed on the user's computer, executed as a standalone software package, partially executed on the user's computer and partially executed on a remote computer, or completely executed on the remote computer or server. In the case involving the remote computer, the remote computer may be connected to the user's computer by any types of networks, including LAN or WAN, or may be connected to an external computer (such as connected by using an internet service provider through the Internet).

The flow diagrams and the block diagrams in the drawings show possibly achieved system architectures, functions, and operations of systems, methods, and computer program products according to various embodiments of the present disclosure. At this point, each box in the flow diagram or the block diagram may represent a module, a program segment, or a part of a code, the module, the program segment, or a part of the code contains one or more executable instructions for achieving the specified logical functions. It should also be noted that in some alternative implementations, the function indicated in the box may also occur in a different order from those indicated in the drawings. For example, two consecutively represented boxes may actually be executed basically in parallel, and sometimes it may also be executed in an opposite order, this depends on the function involved. It should also be noted that each box in the block diagram and/or the flow diagram, as well as combinations of the boxes in the block diagram and/or the flow diagram, may be achieved by using a dedicated hardware-based system that performs the specified function or operation, or may be achieved by using combinations of dedicated hardware and computer instructions.

The involved units described in the embodiments of the present disclosure may be achieved by a mode of software, or may be achieved by a mode of hardware. Herein, the name of the unit does not constitute a limitation for the unit itself in some cases.

The functions described above in this article may be at least partially executed by one or more hardware logic components. For example, non-limiting exemplary types of the hardware logic component that may be used include: a field programmable gate array (FPGA), an application specific integrated circuit (ASIC), an application specific standard product (ASSP), a system on chip (SOC), a complex programmable logic device (CPLD) and the like.

In the context of the present disclosure, the machine-readable medium may be a visible medium, and it may contain or store a program for use by or in combination with an instruction executive system, apparatus, or device. The machine-readable medium may be a machine-readable signal medium or a machine-readable storage medium. The machine-readable medium may include but is not limited to an electronic, magnetic, optical, electromagnetic, infrared, or semiconductor system, apparatus, or device, or any suitable combinations of the above. More specific examples of the machine-readable storage medium may include an electric connector based on one or more wires, a portable computer disk, a hard disk drive, RAM, ROM, EPROM (or a flash memory), an optical fiber, CD-ROM, an optical storage device, a magnetic storage device, or any suitable combinations of the above.

According to at least one embodiment of the present disclosure, Example 1 provides a livestreaming page display method, including:
 displaying a livestreaming page, wherein a first image is displayed in the livestreaming page, and the first image is a livestreaming image;
 receiving a display operation for a game; and
 in response to the display operation, displaying the first image in a first region of the livestreaming page, and displaying a second image of the game in a second region of the livestreaming page, wherein the second region is located outside the first region.

According to at least one embodiment of the present disclosure, Example 2 is the method according to Example 1, further including:
 displaying interactive information on the first image in response to the display operation.

According to at least one embodiment of the present disclosure, Example 3 is the method according to Example 1, interactive information is also displayed in the livestreaming page, the displaying the first image in a first region of the livestreaming page, and displaying a second image of the game in a second region of the livestreaming page, includes:
 displaying the first image in the first region of the livestreaming page, displaying the second image of the game in the second region of the livestreaming page, and displaying the interactive information outside the second region.

According to at least one embodiment of the present disclosure, Example 4 is the method according to Example 3, wherein the displaying the first image in the first region of the livestreaming page, displaying the second image of the game in the second region of the livestreaming page, and displaying the interactive information outside the second region, includes:
 determining the second region in the livestreaming page, displaying the second image of the game in the second region, and determining a display range of the first region where the first image is located and a display position of the interactive information according to a display range of the second region, so as to display the first image and the interactive information.

According to at least one embodiment of the present disclosure, Example 5 is the method according to Example 1, wherein, in response to the display operation, displaying the first image in a first region of the livestreaming page, and displaying a second image of the game in a second region of the livestreaming page, includes:
 in response to the display operation, displaying a plurality of candidate page layouts;
 receiving a selection operation for any of the plurality of candidate page layouts, and determining a candidate page layout corresponding to the selection operation as a target page layout; and
 according to the target page layout, displaying the first image in the first region of the livestreaming page and displaying the second image of the game in the second region of the livestreaming page.

According to at least one embodiment of the present disclosure, Example 6 is the method according to Example 1, in response to the display operation, displaying the first image in a first region of the livestreaming page, and displaying a second image of the game in a second region of the livestreaming page, includes:
 determining a target page layout according to a livestreaming video type, wherein the livestreaming video type includes a landscape image or a portrait image; and
 according to the target page layout, displaying the first image in the first region of the livestreaming page and displaying the second image of the game in the second region of the livestreaming page.

According to at least one embodiment of the present disclosure, Example 7 is the method according to Example 1, before receiving the display operation for the game, further including:
 in response to a start operation for the game in the livestreaming page, displaying the second image of the game on top of the first image.

According to at least one embodiment of the present disclosure, Example 8 is the method according to Example 7, wherein the displaying the second image of the game in the second region of the livestreaming page, includes:
 adjusting the second image of the game to a layer where the first image is located for display.

According to at least one embodiment of the present disclosure, Example 9 is the method according to any one of Example 1-Example 8, after displaying the first image in the first region of the livestreaming page, and displaying a second image of the game in a second region of the livestreaming page, further including:
 sending the first image and the second image displayed in the livestreaming page to a server to make the server push the first image and the second image to a client for display.

According to at least one embodiment of the present disclosure, Example 10 is the method according to any one of Example 1-Example 8, wherein the displaying the first image in the first region of the livestreaming page, includes:
 cropping the first image according to a display range of the first region, and displaying a cropped first image in the first region.

According to at least one embodiment of the present disclosure, Example 11 provides a livestreaming page display apparatus, including:
 a page display module configured to display a livestreaming page, wherein a first image is displayed in the livestreaming page, and the first image is a livestreaming image;
 an operation receiving module configured to receive a display operation for a game; and
 an screen display module configured to, in response to the display operation, display the first image in a first region of the livestreaming page, and display a second image of the game in a second region of the livestreaming page, wherein the second region is located outside the first region.

According to at least one embodiment of the present disclosure, Example 12 provides an electronic device, including:
 at least one processor; and
 a memory communicatively connected with the at least one processor; wherein
 the memory stores a computer program executable by the at least one processor, and the computer program, when executed by the at least one processor, causes the at least one processor to implement the livestreaming page display method according to any one of Examples 1-10.

According to at least one embodiment of the present disclosure, Example 13 provides a computer-readable storage medium, wherein the computer-readable storage medium stores computer instructions for causing a processor to implement the livestreaming page display method according to any one of Examples 1-10.

According to at least one embodiment of the present disclosure, Example 14 provides a computer program product, including a computer program which, when executed by a processor, realizes the livestreaming page display method according to any one of Examples 1-10.

Furthermore, although the operations are depicted in a particular order, this should not be understood as requiring that these operations be performed in the particular order shown or in a sequential order. Under certain circumstances, multitasking and parallel processing may be beneficial. Likewise, although several specific implementation details are contained in the above discussion, these should not be construed as limiting the scope of the present disclosure. Some features described in the context of separate embodiments can also be combined in a single embodiment. On the contrary, various features described in the context of a single embodiment can also be implemented in multiple embodiments individually or in any suitable sub-combination.

The invention claimed is:

1. A livestreaming page display method, comprising:
displaying a livestreaming page, wherein a first image is displayed in the livestreaming page, and the first image is a livestreaming image;
receiving a display operation for a game; and
in response to the display operation, displaying the first image in a first region of the livestreaming page, and displaying a second image of the game in a second region of the livestreaming page, wherein the second region is located outside the first region;
wherein interactive information is also displayed in the livestreaming page, the interactive information comprises comment information,
the displaying the first image in a first region of the livestreaming page, and displaying a second image of the game in a second region of the livestreaming page, comprises:
displaying the first image in the first region of the livestreaming page, displaying the second image of the game in the second region of the livestreaming page, and displaying the interactive information in the first region,
wherein the displaying the first image in the first region of the livestreaming page displaying the second image of the game in the second region of the livestreaming page, and displaying the interactive information in the first region, comprises:
determining the second region in the livestreaming page, displaying the second image of the game in the second region, and determining a display range of the first region where the first image is located and a display position of the interactive information according to a display range of the second region, so as to display the first image and the interactive information.

2. The method according to claim 1, further comprising:
displaying interactive information on the first image in response to the display operation.

3. The method according to claim 1, wherein, in response to the display operation, displaying the first image in the first region of the livestreaming page, and displaying the second image of the game in the second region of the livestreaming page, comprises:
in response to the display operation, displaying a plurality of candidate page layouts;
receiving a selection operation for any of the plurality of candidate page layouts, and determining a candidate page layout corresponding to the selection operation as a target page layout; and
according to the target page layout, displaying the first image in the first region of the livestreaming page and displaying the second image of the game in the second region of the livestreaming page.

4. The method according to claim 1, wherein, in response to the display operation, displaying the first image in the first region of the livestreaming page, and displaying the second image of the game in the second region of the livestreaming page, comprises:
determining a target page layout according to a livestreaming video type, wherein the livestreaming video type comprises a landscape image or a portrait image; and
according to the target page layout, displaying the first image in the first region of the livestreaming page and displaying the second image of the game in the second region of the livestreaming page.

5. The method according to claim 1, before receiving the display operation for the game, further comprising:
in response to a start operation for the game in the livestreaming page, displaying the second image of the game on top of the first image.

6. The method according to claim 5, wherein the displaying the second image of the game in the second region of the livestreaming page, comprises:
adjusting the second image of the game to a layer where the first image is located for display.

7. The method according to claim 1, after displaying the first image in the first region of the livestreaming page, and displaying the second image of the game in the second region of the livestreaming page, further comprising:
sending the first image and the second image displayed in the livestreaming page to a server to make the server push the first image and the second image to a client for display.

8. The method according to claim 1, wherein the displaying the first image in the first region of the livestreaming page, comprises:
cropping the first image according to a display range of the first region, and displaying a cropped first image in the first region.

9. The method according to claim 1, wherein the livestreaming image is a real-time image of an anchor,
the displaying a livestreaming page, comprises: before receiving the display operation, displaying the first image in full screen.

10. An electronic device, comprising:
at least one processor; and
a memory communicatively connected with the at least one processor, wherein
the memory stores a computer program executable by the at least one processor, and the computer program, when executed by the at least one processor, causes the at least one processor to implement a livestreaming page display method,
wherein the livestreaming page display method comprises:
displaying a livestreaming page, wherein a first image is displayed in the livestreaming page, and the first image is a livestreaming image;
receiving a display operation for a game; and
in response to the display operation, displaying the first image in a first region of the livestreaming page, and displaying a second image of the game in a second region of the livestreaming page, wherein the second region is located outside the first region;

wherein interactive information is also displayed in the livestreaming page, the interactive information comprises comment information, the displaying the first image in a first region of the livestreaming page, and displaying a second image of the game in a second region of the livestreaming page, comprises:

displaying the first image in the first region of the livestreaming page, displaying the second image of the game in the second region of the livestreaming page, and displaying the interactive information in the first region, wherein the displaying the first image in the first region of the livestreaming page, displaying the second image of the game in the second region of the livestreaming page, and displaying the interactive information in the first region, comprises:

determining the second region in the livestreaming page, displaying the second image of the game in the second region, and determining a display range of the first region where the first image is located and a display position of the interactive information according to a display range of the second region, so as to display the first image and the interactive information.

11. The electronic device according to claim 10, further comprising:

displaying interactive information on the first image in response to the display operation.

12. The electronic device according to claim 10, wherein, in response to the display operation, displaying the first image in the first region of the livestreaming page, and displaying the second image of the game in the second region of the livestreaming page, comprises:

in response to the display operation, displaying a plurality of candidate page layouts;

receiving a selection operation for any of the plurality of candidate page layouts, and determining a candidate page layout corresponding to the selection operation as a target page layout; and according to the target page layout, displaying the first image in the first region of the livestreaming page and displaying the second image of the game in the second region of the livestreaming page.

13. The electronic device according to claim 10, wherein, in response to the display operation, displaying the first image in the first region of the livestreaming page, and displaying the second image of the game in the second region of the livestreaming page, comprises:

determining a target page layout according to a livestreaming video type, wherein the livestreaming video type comprises a landscape image or a portrait image; and according to the target page layout, displaying the first image in the first region of the livestreaming page and displaying the second image of the game in the second region of the livestreaming page.

14. The electronic device according to claim 10, before receiving the display operation for the game, further comprising:

in response to a start operation for the game in the livestreaming page, displaying the second image of the game on top of the first image.

15. A non-transitory computer-readable storage medium, wherein the computer-readable storage medium stores computer instructions for causing a processor to implement a livestreaming page display method, wherein the livestreaming page display method comprises:

displaying a livestreaming page, wherein a first image is displayed in the livestreaming page, and the first image is a livestreaming image;

receiving a display operation for a game; and in response to the display operation, displaying the first image in a first region of the livestreaming page, and displaying a second image of the game in a second region of the livestreaming page, wherein the second region is located outside the first region;

wherein interactive information is also displayed in the livestreaming page, the interactive information comprises comment information, the displaying the first image in a first region of the livestreaming page, and displaying a second image of the game in a second region of the livestreaming page, comprises:

displaying the first image in the first region of the livestreaming page, displaying the second image of the game in the second region of the livestreaming page, and displaying the interactive information in the first region, wherein the displaying the first image in the first region of the livestreaming page, displaying the second image of the game in the second region of the livestreaming page, and displaying the interactive information in the first region, comprises:

determining the second region in the livestreaming page displaying the second image of the game in the second region, and determining a display range of the first region where the first image is located and a display position of the interactive information according to a display range of the second region, so as to display the first image and the interactive information.

\* \* \* \* \*